United States Patent
Holman et al.

(10) Patent No.: US 9,760,477 B1
(45) Date of Patent: Sep. 12, 2017

(54) SELF-HEALING JOB EXECUTOR POOL

(71) Applicant: LinkedIn Corporation, Mountain View, CA (US)

(72) Inventors: Dwight Edward Holman, San Jose, CA (US); Peter Hao Manh Nguyen, San Jose, CA (US); Jens Pillgram-Larsen, Pleasanton, CA (US); Shaobo Sun, Sunnyvale, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 0 days.

(21) Appl. No.: 15/096,983

(22) Filed: Apr. 12, 2016

(51) Int. Cl.
*G06F 9/44* (2006.01)
*G06F 11/36* (2006.01)

(52) U.S. Cl.
CPC ...... *G06F 11/3688* (2013.01); *G06F 11/3636* (2013.01)

(58) Field of Classification Search
CPC ............. G06F 11/3688; G06F 11/3636; G06F 11/3466; G06F 11/3409
USPC .................................................. 717/126, 127
See application file for complete search history.

(56) References Cited

U.S. PATENT DOCUMENTS

| | | | | |
|---|---|---|---|---|
| 5,889,938 A | * | 3/1999 | Tanaka ................ | G06F 11/1084 714/2 |
| 2001/0047406 A1 | * | 11/2001 | Araujo .................... | H04L 29/06 709/223 |
| 2001/0056554 A1 | * | 12/2001 | Chrabaszcz ......... | G06F 11/1658 714/13 |
| 2002/0196687 A1 | * | 12/2002 | Sauvageau .......... | G11C 29/808 365/200 |
| 2006/0036389 A1 | * | 2/2006 | Ozora .................. | G01R 31/319 702/108 |
| 2008/0282113 A1 | * | 11/2008 | Yuuki .................. | G06F 11/0727 714/45 |
| 2015/0163091 A1 | * | 6/2015 | Thubert .............. | H04L 41/0668 370/225 |
| 2016/0342459 A1 | * | 11/2016 | Thiel ................... | G06F 11/0709 |

* cited by examiner

*Primary Examiner* — Anna Deng
(74) *Attorney, Agent, or Firm* — Schwegman Lundberg & Woessner, P.A.

(57) ABSTRACT

Aspects of the present disclosure relate to a self-healing job executor pool. A server detects that a job executing on an executor failed. The server determines, based on at least one factor from a predetermined set of executor-related factors, that the job executing on the executor failed due to a state of the executor. The server adjusts, in response to determining that the job executing on the executor failed due to the state of the executor, the state of the executor to a known good state, where the known good state is selected from a stored set of known good states.

16 Claims, 4 Drawing Sheets

SELF-HEALING JOB EXECUTOR POOL

TECHNICAL FIELD

The subject matter disclosed herein relates to job execution, where a job may include, among other things, software code for testing. In particular, example embodiments may relate to a self-healing job executor pool.

BACKGROUND

Software developers may submit jobs that include software code for testing for execution at an executor within an executor pool. In some cases, a job may fail. The failure may be caused due to a problem related to the job or due to a state of the executor. If the problem is related to the job, the software developer may make changes to the software code of the job. However, if the problem is related to the executor, the executor with the problem may need to be identified and repaired, for example, by a technician visiting the executor pool. As the foregoing illustrates, new approaches may be desirable for identifying whether a job execution failure is due to a problem with the executor or a problem with the job, and for repairing the executor if the failure is due to the problem with the executor.

SUMMARY

In one innovative aspect, the disclosed subject matter can be embodied in a method. The method includes detecting that a job executing on an executor failed. The method includes determining, based on at least one factor from a predetermined set of executor-related factors, that the job executing on the executor failed due to a state of the executor. The method includes adjusting, in response to determining that the job executing on the executor failed due to the state of the executor, the state of the executor to a known good state, wherein the known good state is selected from a stored set of known good states.

In one innovative aspect, the disclosed subject matter can be embodied in a non-transitory computer-readable medium including instructions. The instructions include code to detect that a job executing on an executor failed. The instructions include code to determine, based on at least one factor from a predetermined set of executor-related factors, that the job executing on the executor failed due to a state of the executor. The instructions include code to adjust, in response to determining that the job executing on the executor failed due to the state of the executor, the state of the executor to a known good state, wherein the known good state is selected from a stored set of known good states.

In one innovative aspect, the disclosed subject matter can be embodied in a system. The system includes one or more processors and a memory. The memory includes instructions to detect that a job executing on an executor failed. The memory includes instructions to determine, based on at least one factor from a predetermined set of executor-related factors, that the job executing on the executor failed due to a state of the executor. The memory includes instructions to adjust, in response to determining that the job executing on the executor failed due to the state of the executor, the state of the executor to a known good state, wherein the known good state is selected from a stored set of known good states.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

As noted above, according to some implementations, a software developer working at a client computing device submits a job, which includes software code, for execution or testing at an executor within an executor pool. The executor pool may include many (e.g., millions) executors, some of which may have problems that prevent them from executing code correctly. Multiple different developers may submit many (e.g., hundreds of thousands) jobs each day. This causes executor failure to become more and more common, causing software developers to worry about their code not running correctly when, in fact, there are no programming errors in their code and the problems lie with the executor.

After receiving a job submission, execution of the job is requested at the executor. A control server detects that the job failed. The control server determines whether the job failed due to a state of the executor or due to a problem related to the job. Problems related to the executor may include physical damage to the hardware of the executor, programming bugs in the source code of the executor, or the executor being in a state in which it cannot execute the job. Problems related to the job may include programming bugs in the software of the job. If the job failed due to a problem related to the job, the control server provides, to the client computing device of the software developer, a notification that the job failed due to a problem related to the job. If the job failed due to a problem with the executor, the control server causes execution of the job at a different executor within the executor pool. The control server removes the executor that failed from the executor pool and quarantines the executor. The control server adjusts the state of the executor to a known good state, from which the executor can execute jobs without experiencing executor-related problems. After adjusting the state of the executor to the known good state, the control server returns the executor from quarantine to the executor pool.

The job submission may be received at the executor from any source. In one example, the job submission is received from a developer's client computing device. In another example, the job submission is received from a central orchestrator in response to other events, such as developer requests, the submission of completed code, etc.

Implementations of the subject technology may provide advantages. For example, according to some implementations, if a job fails for an executor-related problem, the job may be executed at another executor. The software developer submitting the job may experience additional latency due to the job being submitted to the second executor but, otherwise, may not experience any negative effects due to the executor-related problem. In addition, some implementations of the subject technology provide for adjustment of an executor to a known good state in response to an executor-related problem. This adjustment may be automatic, removing the need for a technician to visit the executor and, thereby, saving time and money.

Figure 1:
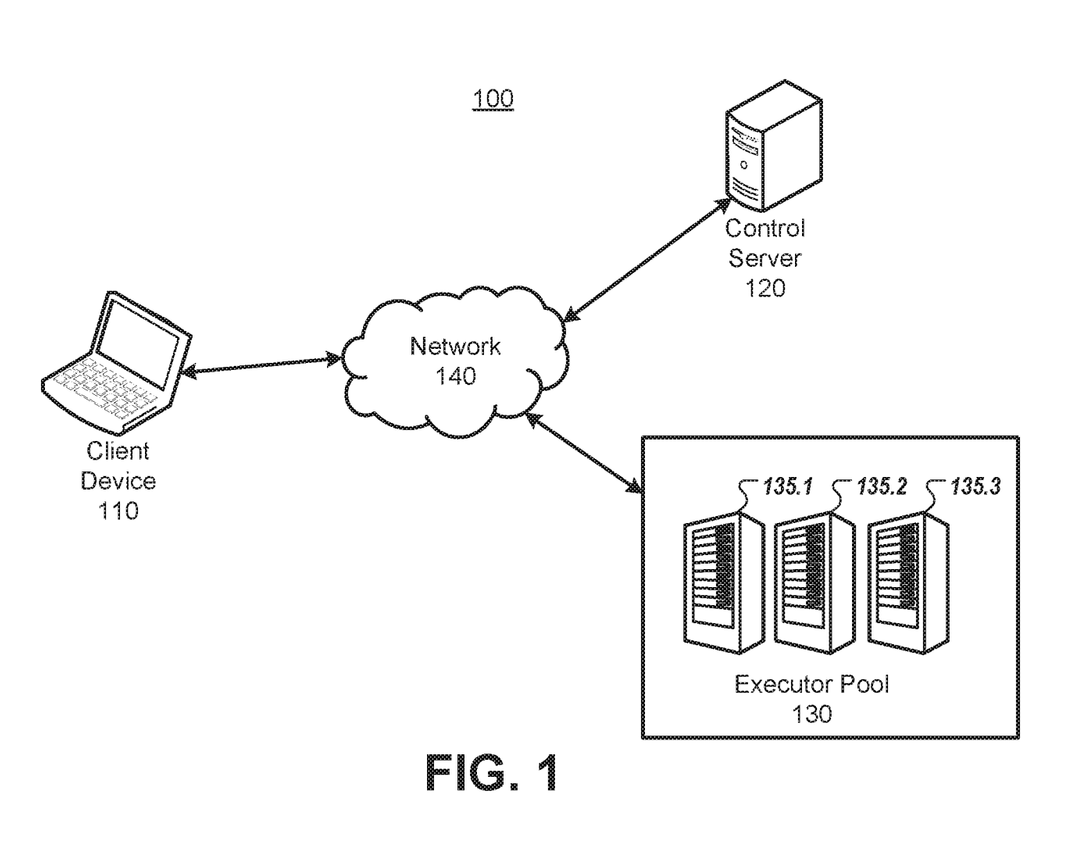
FIG. 1 is a diagram of an example system in which a job may be executed.

FIG. 1 is a diagram of an example system 100 in which a job may be executed. As shown, the system 100 includes a client computing device 110, a control server 120, and an executor pool 130 connected to one another via a network 140. The executor pool 130 includes multiple executors 135.1-3. The network 140 may include one or more of the Internet, an intranet, a local area network (LAN), a wide area network (WAN), a cellular network, a WiFi network, a virtual private network (VPN), a public network, a wired network, a wireless network, and the like.

The client computing device 110 may include one or more of a laptop computer, a desktop computer, a mobile phone, a tablet computer, a personal digital assistant (PDA), a digital music player, and the like. The client computing device 110 may include an application (or multiple applications), such as a web browser or a special purpose application, for communicating with the control server 120 and the executor pool 130. Using the application, a user of the client computing device 110, who may be a software developer, may create a job and request execution of the job at an executor 135.$k$ (where k is a number between 1 and 3) within the executor pool 130.

The control server 120 stores data or instructions. The control server may be programmed to monitor the executors 135.1-3 in the executor pool 130 to detect that a job executing at an executor 135.$k$ has failed and to respond to the failure. More details of the operation of the control server 120 are discussed in conjunction with FIG. 2 and FIG. 3. While the control server 120 is illustrated herein as being a single machine, the control server 120 may be implemented either as a single machine or as multiple machines. For example, the control server 120 may be a server farm including multiple machines where processing tasks are split between the multiple machines.

The executor pool 130 includes multiple executors 135.1-3. While three executors 135.1-3 are illustrated, the subject technology may be implemented with any number of executors within the executor pool 130. For example, the executor pool 130 may include millions of executors. Each executor 135.$k$ may include processing hardware and a memory. The processing hardware may be programmed to receive, via the network 140, a job from the client computing device 110, to execute the job, and to provide, via the network 140, a result of the execution of the job to the client computing device 110. The executor pool 130 is illustrated as including executors 135.1-3 that are proximate to one another. However, the executors 135.1-3 may be located in distant geographic locations and connected to one another over the network 140. As used herein, the phrase "executor pool" does not imply that the executors 135.1-3 of the executor pool 130 are in the same physical place or geographic location, but only implies that multiple executors are pooled for access via client computing device(s) and control server(s). Each executor 135.$k$ may include any machine capable of executing a job. For example, the executor 135.$k$ may be a physical machine, a virtual machine, or a combination of physical or virtual resources.

The subject technology is illustrated in FIG. 1 as being implemented in conjunction with a single client computing device 110, control server 120, and executor pool 130 connected via a single network 140. However, the subject technology may be implemented in conjunction with one or more client computing devices, control servers, executor pools, or networks. Some implementations may include multiple client computing devices (of multiple software developers) connected with multiple control servers and executor pools over the Internet and various private networks.

Furthermore, FIG. 1 illustrates the client computing device 110, control server 120, and executor pool 130 being separate and distinct from one another. However, in some implementations, these different machines can be combined. For example, the control server 120 may reside within the executor pool 130 or a single machine may serve as both the client computing device 110 and the control server 120.

Figure 2:
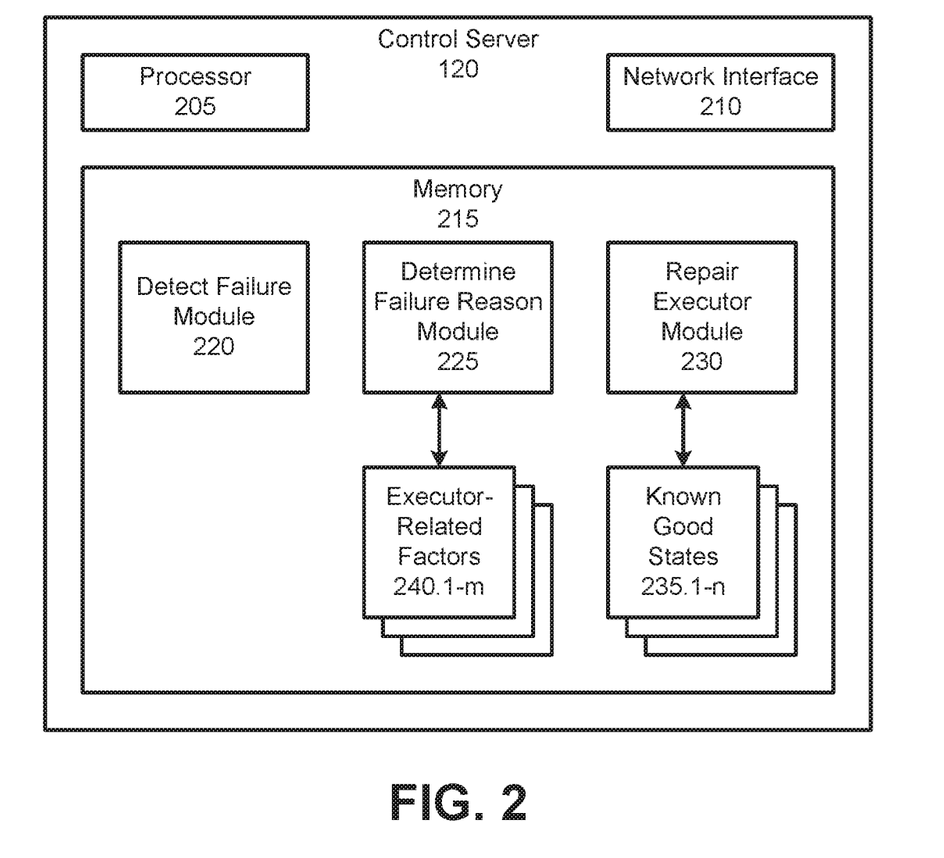
FIG. 2 is a block diagram of an example of the control server of FIG. 1.

FIG. 2 is a block diagram of an example of the control server 120 of FIG. 1. As shown, the control server 120 includes a processor 205, a network interface 210, and a memory 215. The processor 205 executes machine instructions, which may be stored in the memory 215. While a single processor 205 is illustrated, the control server 120 may include multiple processors arranged into multiple processing units (e.g., central processing unit (CPU), graphics processing unit (GPU), etc.). The processor 205 may include one or more processors. The network interface 210 allows the control server 120 to send and receive data via the network 140. The network interface 210 may include one or more network interface cards (NICs). The memory 215 stores data or instructions. As shown, the memory 215 includes a detect failure module 220, a determine failure reason module 225, a repair executor module 230, known good states 235.1-$n$, and executor-related factors 240.1-$m$.

The detect failure module 220, when executed by the processor 205, causes the processor 205 to detect that a job executing on an executor 135.$k$ failed. The determine failure reason module 225, when executed by the processor 205, causes the processor 205 to determine whether the job failed due to a state of the executor 135.$k$ or due to a problem related to the job. The processor 205 may determine whether the job failed due to the state of the executor 135.$k$ based on at least one factor from the executor-related factors 240.1-$r$. The executor-related factors 240.1-$m$ may include, among other things, an amount of time the job has been executing on the executor, an amount of code executed on the executor, an output from the executor, feedback from a machine requesting the job (e.g., client computing device 110), a sequence of actions taken by the executor, and an environmental state of the executor. For example, the control server 120 may determine that the job failed due to the state of the executor 135.$k$ if the amount of time the job has been executing on the executor 135.$k$ is either below a lower threshold time (e.g. 1 second, 5 seconds, 10 seconds, etc.) or above an upper threshold time (e.g., 1 hour, 2 hours, etc.).

The lower threshold time and upper threshold time may either be fixed amounts of time or may be variable amounts of time that depend on (e.g., are linearly proportional to) the size (e.g., in lines of code) of the job. If the processor 205 determines that the job failed due to the state of the executor 135.k, the repair executor module 230 is invoked.

To avoid wrong assertion being added to executor-related factors 240 which might affect entire executor pool, certain thresholds could be enabled in the control server 120. For example, the thresholds could be used to ensure that only X number of executors are identified with executor-related errors in a time frame of Y, where X could be a fixed number or a percentage of entire capacity of executor pool and Y could be a fixed number of minutes/hours or dynamically determined based on the frequency of executor-related errors. When these thresholds are reached, the control server 120 pauses some or all activities and notifies system administrators to scrutinize the results. The control server 120 resumes its activity automatically after the number of errors falls below the threshold. In some cases, this technique prevents activity of the control server 120 in a case where executor related errors are being identified excessively.

The repair executor module 230, when executed by the processor 205, causes the processor 205 to remove the executor 135.k with the problem from the executor pool 130 and to quarantine the executor 135.k. As a result of the quarantine, the executor 135.k may not be able to accept additional jobs from client computing devices (e.g., client computing device 110). The processor 205 executing the repair executor module 230 may adjust the executor 135.k to one of the known good states 235.1-n stored in the memory 215 of the control server 120. The known good states 235.1-n represent states of the executors 135.1-3 in the executor pool 130 when the executors were functioning normally and able to execute jobs without experiencing problems. Thus, adjusting the executor 135.k to one of the known good states 235.1-n may cause the executor 135.k to be able to execute jobs without experiencing problems. After adjusting the executor 135.k to one of the known good states 235.1-n, the processor 205 executing the repair executor module 230 returns the executor 135.k from quarantine to the executor pool 130.

Figure 3:
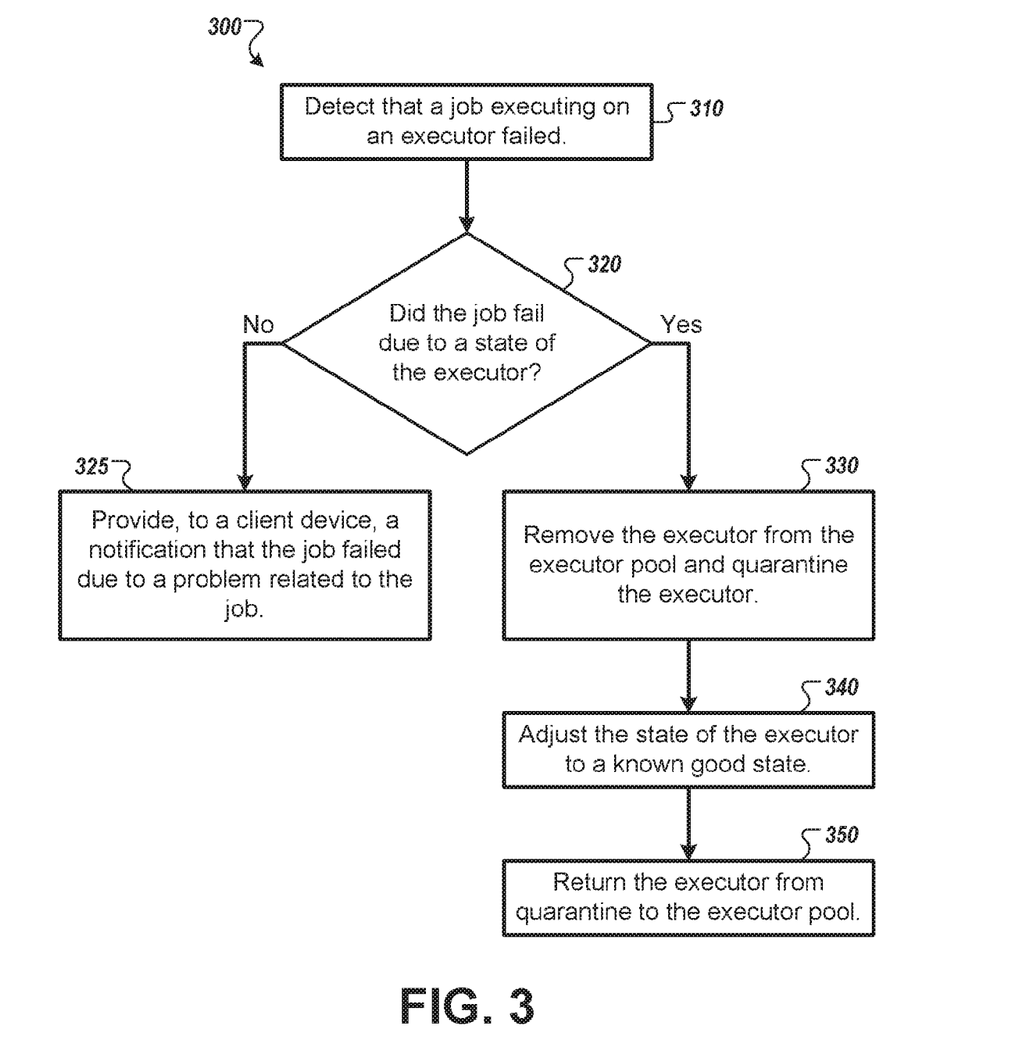
FIG. 3 is a flowchart illustrating a process for handling a job execution failure.

FIG. 3 is a flowchart illustrating a process 300 for handling a job execution failure. The process 300 may be implemented at the control server 120.

The process 300 begins at step 310, where the control server 120 detects that a job executing on an executor 135.k failed. For example, the control server 120 may monitor the executors 135.1-3 in the executor pool 130 for failures. Alternatively, the control server 120 may occasionally access an executor 135.k that is executing a job to determine whether it has failed or completed execution of the job successfully. The job may include software code for testing and may have been submitted to the executor pool 130 from a client computing device 110 of a software developer. The executor 135.k may be any physical or virtual device capable of executing software code.

At step 320, the control server 120 determines whether the job failed due to a state of the executor 135.k or due to a problem related to the job. Examples of states of the executor 135.k that could cause failure of the job include bugs in the source code of the executor 135.k, the executor 135.k lacking access to processing, memory or network resources, contention for resources of the executor 135.k with other jobs, problems with the virtual machine, physical machine, or resources of the executor 135.k, and the like. Examples of problems related to the job include bugs in the source code of the job.

The control server 120 may determine whether the job failed due to the state of the executor 135.k based on at least one factor from a predetermined set of executor-related factors 240.1-m. The executor-related factors 240.1-m may include, among other things, an amount of time the job has been executing on the executor, an amount of code executed on the executor, an output from the executor, feedback from a machine requesting the job (e.g., client computing device 110), a sequence of actions taken by the executor, and an environmental state of the executor. For example, the control server 120 may determine that the job failed due to the state of the executor 135.k if the amount of time the job has been executing on the executor 135.k is either below a lower threshold time (e.g. 1 second, 5 seconds, 10 seconds, etc.) or above an upper threshold time (e.g., 1 hour, 2 hours, etc.). The lower threshold time and upper threshold time may either be fixed amounts of time or may be variable amounts of time that depend on (e.g., are linearly proportional to) the size (e.g., in lines of code) of the job. If the control server 120 determines that the job failed due to the state of the executor 135.k, the process 300 continues to step 330. Otherwise, the process 300 continues to step 325.

According to some examples, the output from the executor includes "no disk space available" or includes more complex information, such as a dynamic determination that completion is unlikely based on the progress of the job. In some examples, the output from the executor includes a job executor (e.g., implemented on a mobile phone) not being able to produce device emulators because the tooling for device emulators was uninstalled or corrupted, generating specific error messages.

According to some implementations, the feedback from the machine requesting the job includes oversight external to the job itself. For instance, the machine requesting the job measures a time difference between a time when the job was requested and a time when the result of the job was provided. If the time difference is below a minimum threshold or above a maximum threshold, the machine determines that the executor is in a bad state.

In some cases, an executor may lose power (or otherwise stop functioning) in the middle of a job. In these circumstances, the executor itself is unable to indicate that it is in a bad state. Thus, to respond to these circumstances, the machine requesting the job may determine that a maximum threshold time has expired or that the executor is not responsive (e.g., to a ping request). Upon determining that the maximum threshold time has expired or that the executor is not responsive, the machine requesting the job provides an output indicating that the executor is in a bad state, such that remediation may be performed.

At step 325, upon determining that the job did not fail due to a state of the executor 135.k, the control server 120 provides, to the client computing device 110 of the software developer, a notification that the job failed due to a problem related to the job. The notification may be a push notification or a notification transmitted via a messaging system, such as email. After step 325, the process 300 ends.

At step 330, upon determining that the job failed due to a problem with the executor 135.k, the control server 120 may remove the executor 135.k that failed from the executor pool 130 and quarantine the executor 135.k that failed. While quarantined, the executor 135.k may be prevented from running jobs that are submitted from client computing device(s), such as client computing device 110, to the executor pool 130. Meanwhile, the control server 120 may execute the job that failed on the executor 135.*k* on a different executor selected from among the executors 135.1-3 remaining in the executor pool 130.

At step 340, the control server 120 adjusts a state of the executor 135.*k* to a known good state 235.*j* (where j is a number between 1 and n). The known good state 235.*j* may be selected from a set of known good states 235.1-*n*. The control server 120 may compute a difference (e.g., measured in an amount of software or hardware that needs to be modified) between the state of the executor 135.*k* and each of the known good states 235.1-*n*. The control server 120 may select the known good state 235.*j* to which the state of the executor 135.*k* is to be adjusted based on the difference being smaller than a threshold difference. For instance, the state 235.*j* may correspond to the state, from among the known good states 235.1-*n*, that has the smallest difference from the state of the executor 135.*k*.

At step 350, after the executor 135.*k* has been adjusted to the known good state 235.*j*, the control server 120 returns the executor 135.*k* from quarantine to the executor pool 130. Upon return to the executor pool 130, the executor 135.*k* is able to receive job(s) from client computing device(s) and to execute the received job(s). After step 350, the process 300 ends.

Figure 4:
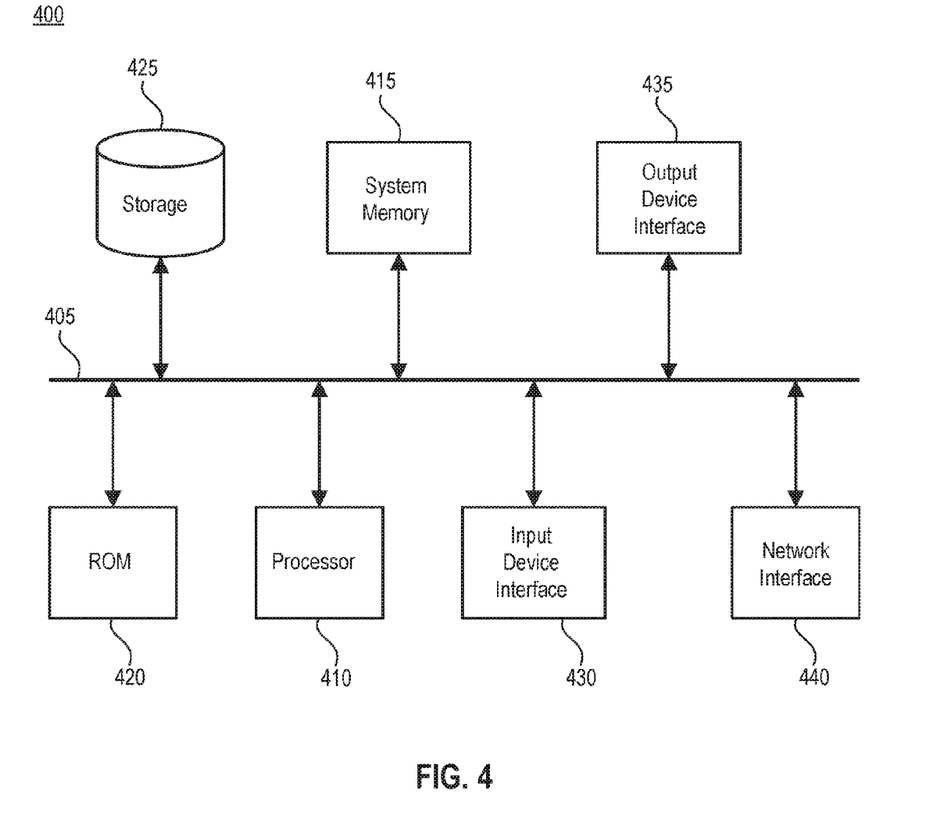
FIG. 4 conceptually illustrates an example electronic system with which some implementations of the subject technology can be implemented.

FIG. 4 conceptually illustrates an electronic system 400 with which some implementations of the subject technology are implemented. For example, one or more of the client computing device 110, the control server 120, or the executors 135.1-3 in the executor pool 130 may be implemented using the arrangement of the electronic system 400. The electronic system 400 can be a computer (e.g., a mobile phone, PDA) or any other sort of electronic device. Such an electronic system includes various types of computer readable media and interfaces for various other types of computer readable media. Electronic system 400 includes a bus 405, processor(s) 410, a system memory 415, a read-only memory (ROM) 420, a permanent storage device 425, an input device interface 430, an output device interface 435, and a network interface 440.

The bus 405 collectively represents all system, peripheral, and chipset buses that communicatively connect the numerous internal devices of the electronic system 400. For instance, the bus 405 communicatively connects the processor(s) 410 with the read-only memory 420, the system memory 415, and the permanent storage device 425.

From these various memory units, the processor(s) 410 retrieves instructions to execute and data to process in order to execute the processes of the subject technology. The processor(s) can include a single processor or a multi-core processor in different implementations.

The ROM 420 stores static data and instructions that are needed by the processor(s) 410 and other modules of the electronic system. The permanent storage device 425, on the other hand, is a read-and-write memory device. This device is a non-volatile memory unit that stores instructions and data even when the electronic system 400 is off. Some implementations of the subject technology use a mass-storage device (for example, a magnetic or optical disk and its corresponding disk drive) as the permanent storage device 425.

Other implementations use a removable storage device (for example a floppy disk, flash disk, and the corresponding disk drive) as the permanent storage device 425. Like the permanent storage device 425, the system memory 415 is a read-and-write memory device. However, unlike storage device 425, the system memory 415 is a volatile read-and-write memory, such as a random access memory (RAM). The system memory 415 stores some of the instructions and data that the processor needs at runtime. In some implementations, the processes of the subject technology are stored in the system memory 415, the permanent storage device 425, or the read-only memory 420. For example, the various memory units include instructions for executing a job or repairing a failing executor in accordance with some implementations. From these various memory units, the processor(s) 410 retrieves instructions to execute and data to process in order to execute the processes of some implementations.

The bus 405 also connects to the input and output device interfaces 430 and 435. The input device interface 430 enables the user to communicate information and select commands to the electronic system. Input devices used with input device interface 430 include, for example, alphanumeric keyboards and pointing devices (also called "cursor control devices"). Output device interface 435 enables, for example, the display of images generated by the electronic system 400. Output devices used with output device interface 435 include, for example, printers and display devices (for example, cathode ray tubes (CRT) or liquid crystal displays (LCD)). Some implementations include devices that function as both input and output devices (for example, a touch screen).

Finally, as shown in FIG. 4, bus 405 also couples electronic system 400 to a network (not shown) through a network interface 440. In this manner, the electronic system 400 can be a part of a network of computers (for example, a LAN, a WAN, or an Intranet) or a network of networks (for example, the Internet). Any or all components of electronic system 400 can be used in conjunction with the subject technology.

The above-described features and applications can be implemented as software processes that are specified as a set of instructions recorded on a computer readable storage medium (also referred to as computer readable medium). When these instructions are executed by one or more processor(s) (which may include, for example, one or more processors, cores of processors, or other processing units), they cause the processor(s) to perform the actions indicated in the instructions. Examples of computer readable media include, but are not limited to, compact disk read-only memories (CD-ROMs), flash drives, RAM chips, hard drives, erasable programmable read only memories (EPROMs), and the like. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage, and memory, that store computer program instructions in a machine-readable or computer-readable medium (alternatively referred to as computer-readable storage media, machine-readable media, or machine-readable storage media). Some examples of such computer-readable media include RAM, ROM, CD-ROM, recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., secure digital (SD) cards, mini-SD cards, micro-SD cards, etc.), magnetic or solid state hard drives, read-only and recordable Blu-Ray® discs, ultra-density optical discs, any other optical or magnetic media, and floppy disks. The computer-readable media can store a computer program that is executable by at least one processor and includes sets of instructions for performing various operations. Examples of computer programs or computer code include machine code, for example, produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server," "processor," and "memory" all refer to electronic or other technological devices. These terms exclude people or groups of people. For the purposes of the specification, the terms display or displaying mean displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user (for example, by sending web pages to a web browser on a user's client computing device in response to requests received from the web browser).

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a LAN and a WAN, an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., a hypertext markup language (HTML) page) to a client computing device (e.g., for purposes of displaying data to and receiving user input from a user interacting with the client computing device). Data generated at the client computing device (e.g., a result of the user interaction) can be received from the client computing device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect," does not imply that the aspect is essential to the subject technology or that the aspect applies to all configurations of the subject technology. A disclosure relating to an aspect may apply to all configurations, or one or more configurations. A phrase, for example, an aspect, may refer to one or more aspects and vice versa. A phrase, for example, a "configuration," does not imply that such configuration is essential to the subject technology or that such configuration applies to all configurations of the subject technology. A disclosure relating to a configuration may apply to all configurations, or one or more configurations. A phrase, for example, a configuration, may refer to one or more configurations and vice versa.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

In this document, the terms "a" or "an" are used, as is common in patent documents, to include one or more than one, independent of any other instances or usages of "at least one" or "one or more." In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels, and are not intended to impose numerical requirements on their objects.

What is claimed is:

1. A method comprising:
   detecting, by a processor, that a job executing on an executor failed;
   determining, by the processor, based on at least one factor from a predetermined set of executor-related factors, that the job executing on the executor failed due to a state of the executor; and
   adjusting, by the processor, in response to determining that the job executing on the executor failed due to the state of the executor, the state of the executor to a known good state selected from a stored set of known good states, wherein adjusting the state of the executor to the known good state comprises:
     computing a difference between the state of the executor and each of a plurality of known good states in the stored set of known good states, wherein computing the difference comprises computing an amount of software or hardware that needs to be modified; and
     selecting the known good state to which the state of the executor is to be adjusted based on the difference being smaller than a threshold difference.

2. The method of claim 1, wherein the executor comprises one or more of: a physical machine, a virtual machine, and a combination of physical and virtual resources.

3. The method of claim 1, wherein the executor comprises a device capable of executing software code; and
   wherein the job comprises software code for testing.

4. The method of claim 1, further comprising:
   executing, in response to determining that the job executing on the executor failed due to the state of the executor, the job on a different executor, the different-executor being selected from a pool of available executors.

5. The method of claim 1, wherein the predetermined set of executor-related factors comprises one or more of: an amount of time the job has been executing on the executor, an amount of code executed on the executor, an output from the executor, feedback from a machine requesting the job, a sequence of actions taken by the executor, and an environmental state of the executor.

6. The method of claim 1, further comprising:
   removing, in response to determining that the job executing on the executor failed due to a state of the executor, the executor from a pool of available executors until the state of the executor is adjusted to the known good state.

7. A non-transitory computer-readable medium comprising instructions which, when executed by one or more computers, cause the one or more computers to:
   detect that a job executing on an executor failed;
   determine, based on at least one factor from a predetermined set of executor-related factors, that the job executing on the executor failed due to a state of the executor, and
   adjust, in response to determining that the job executing on the executor failed due to the state of the executor, the state of the executor to a known good state selected from a stored set of known good states, wherein instructions to adjust the state of the executor to the known good state comprise instructions to:
      compute a difference between the state of the executor and each of a plurality of known good states in the stored set of known good states, wherein instructions to compute the difference comprise instructions to compute an amount of software or hardware that needs to be modified; and
      select the known good state to which the state of the executor is to be adjusted based on the difference being smaller than a threshold difference.

8. The computer-readable medium of claim 7, wherein the executor comprises one or more of: a physical machine, a virtual machine, and a combination of physical and virtual resources.

9. The computer-readable medium of claim 7, wherein the executor comprises a device capable of executing software code; and
   wherein the job comprises software code for testing.

10. The computer-readable medium of claim 7, further comprising instructions which, when executed by the one or more computers, cause the one or more computers to:
    execute, in response to determining that the job executing on the executor failed due to the state of the executor, the job on a different executor, the different executor being selected from a pool of available executors.

11. The computer-readable medium of claim 7, wherein the predetermined set of executor-related factors comprises one or more of: an amount of time the job has been executing on the executor, an amount of code executed on the executor, an output from the executor, feedback from a machine requesting the job, a sequence of actions taken by the executor, and an environmental state of the executor.

12. The computer-readable medium of claim 7, further comprising instructions which, when executed by the one or more computers, cause the one or more computers to:
    remove, in response to determining that the job executing on the executor failed due to a state of the executor, the executor from a pool of available executors until the state of the executor is adjusted to the known good state.

13. A system comprising:
    one or more processors; and
    a memory comprising instructions which, when executed by the one or more processors, cause the one or more processors to:
    detect that a job executing on an executor failed;
    determine, based on at least one factor from a predetermined set of executor-related factors, that the job executing on the executor failed due to a state of the executor, and
    adjust, in response to determining that the job executing on the executor failed due to the state of the executor, the state of the executor to a known good state selected from a stored set of known good states, wherein executed instructions cause the one or more processors to adjust the state of the executor to the known good state comprises:
       compute a difference between the state of the executor and each of a plurality of known good states in the stored set of known good states, wherein instructions to compute the difference comprise instructions to compute an amount of software or hardware that needs to be modified; and
       select the known good state to which the state of the executor is to be adjusted based on the difference being smaller than a threshold difference.

14. The system of claim 13, wherein the executor comprises one or more of: a physical machine, a virtual machine, and a combination of physical and virtual resources.

15. The system of claim 13, wherein the executor comprises a device capable of executing software code; and
    wherein the job comprises software code for testing.

16. The system of claim 13, the memory further comprising instructions which, when executed by the one or more processors, cause the one or more processors to:
    execute, in response to determining that the job executing on the executor failed due to the state of the executor, the job on a different executor, the different executor being selected from a pool of available executors.

* * * * *